Figure 1:
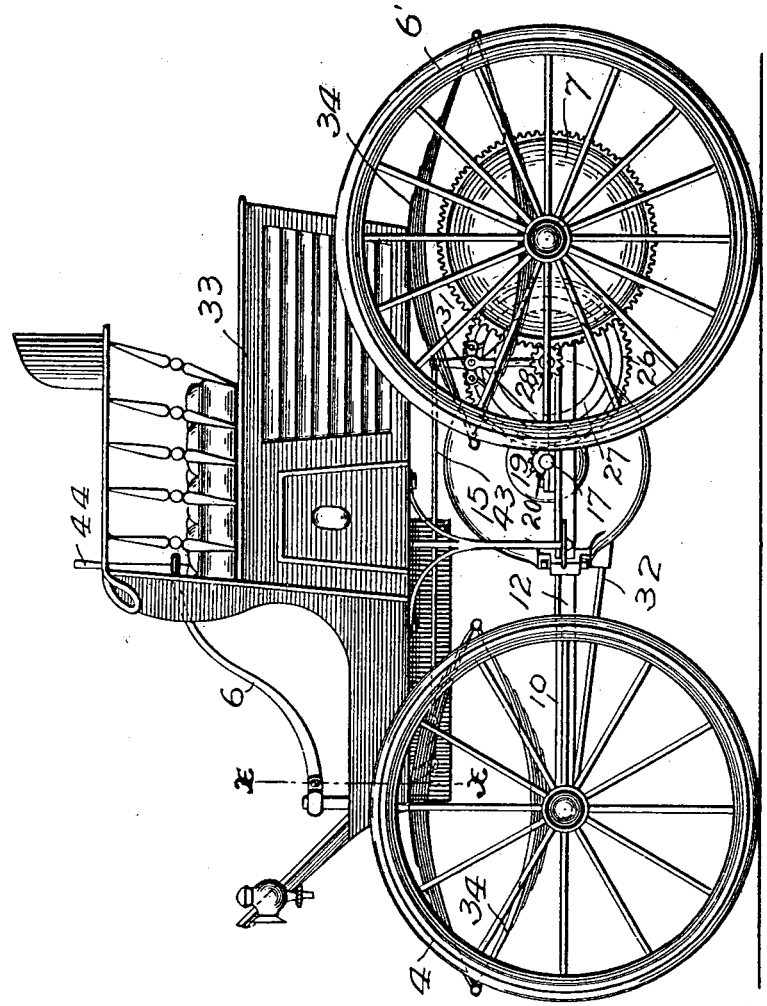

No. 653,199. Patented July 3, 1900.
J. H. MUNSON.
MOTOR VEHICLE.
(Application filed May 16, 1898.)

(No Model.) 4 Sheets—Sheet 1.

Witnesses;
C. E. Van Dorn
J. M. E. Gooley

Inventor;
John H. Munson.
By Paul O. Hawley
his attorneys

No. 653,199. Patented July 3, 1900.
J. H. MUNSON.
MOTOR VEHICLE.
(Application filed May 16, 1898.)
(No Model.) 4 Sheets—Sheet 2.
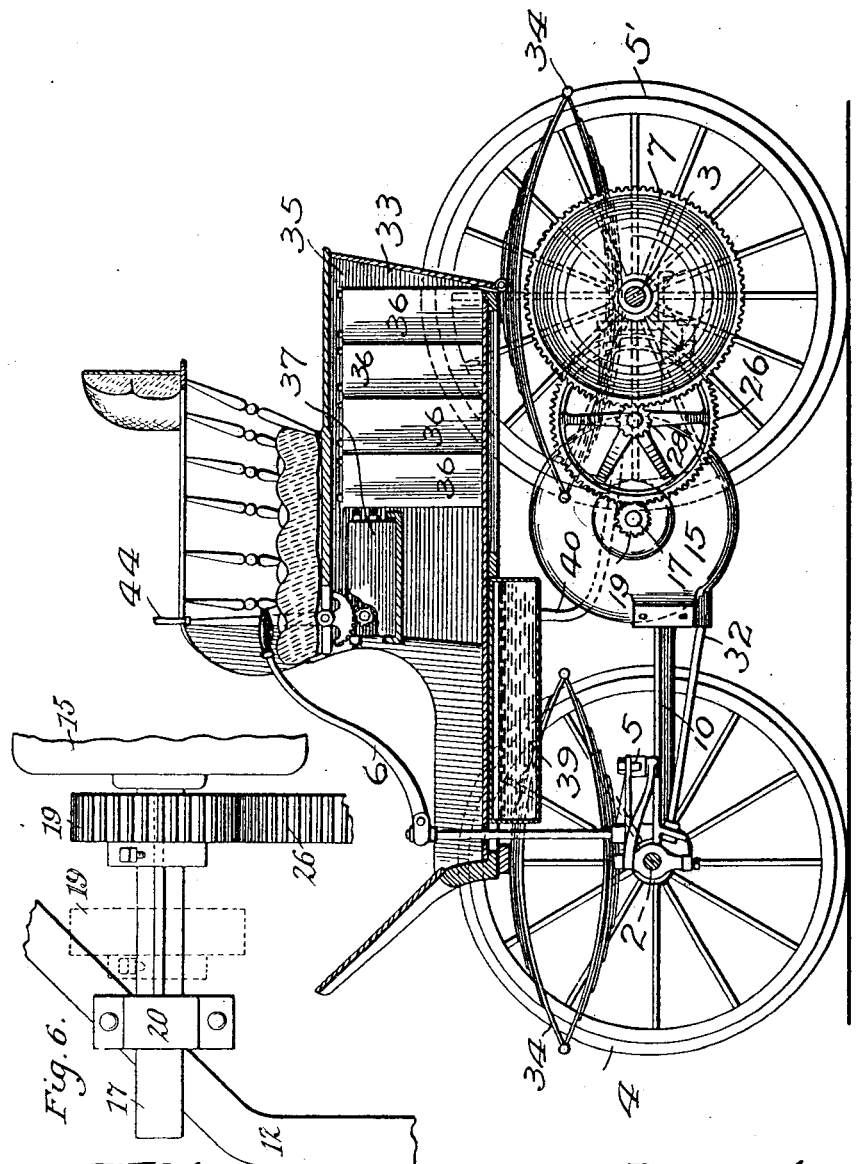
Witnesses:
J. E. Van Doren
M. E. Gooley
Inventor:
John H. Munson
By Paul Hawley
his attorneys No. 653,199. Patented July 3, 1900.
J. H. MUNSON.
MOTOR VEHICLE.
(Application filed May 16, 1898.)

(No Model.) 4 Sheets—Sheet 3.

Witnesses:
O. E. Van Doren,
T. C. Gosley

Inventor:
John H. Munson,
By Paul O. Hawley
his attorneys.

No. 653,199. Patented July 3, 1900.
J. H. MUNSON.
MOTOR VEHICLE.
(Application filed May 16, 1898.)
(No Model.) 4 Sheets—Sheet 4.

Witnesses: Inventor:
C. E. Van Dorn John H. Munson,
M. E. Gooley By Paul O. Hawley
his attorney

UNITED STATES PATENT OFFICE.

JOHN HENRY MUNSON, OF CHICAGO, ILLINOIS.

MOTOR-VEHICLE.

SPECIFICATION forming part of Letters Patent No. 653,199, dated July 3, 1900.

Application filed May 16, 1898. Serial No. 680,792. (No model.)

*To all whom it may concern:*

Be it known that I, JOHN HENRY MUNSON, of the city of Chicago, county of Cook, and State of Illinois, have invented certain new and useful Improvements in Motor-Vehicles, of which the following is a specification.

This invention relates to motor-vehicles or horseless carriages, and particularly to electric-motor vehicles that carry storage batteries and are driven by electric motors.

At present electric-motor vehicles are provided with storage batteries which after being full charged are capable of furnishing sufficient electricity to run the vehicle for from three to five hours, after which lapse of time it is necessary to visit a power-station and have the batteries recharged in order to continue the trip or journey. On account of this dependence upon power-storage stations electric-motor vehicles cannot be used in making long country tours, and the use thereof has been restricted to cities, and even in cities it is often inconvenient to reach the power-stations, and, further, the cost of maintaining the ordinary electric vehicle is great.

One object of my invention is to provide and so equip an electric-motor vehicle that the same will be capable of replenishing or recharging its batteries during the hours that the battery is in actual use, my particular object being to furnish the purchaser of a motor-vehicle with a machine that need never be taken to a storage-station and which may be kept in perfect working order and condition and at its full strength or efficiency at any place or in any part of the city or country.

Another object of the invention is to lessen the weight and also decrease the cost of electric-motor vehicles, and, further, to do away with many of the complications in structure and annoyances in operation that are encountered in motor-vehicles of the present time.

The specific object of this invention is to provide a combined electric and vapor vehicle, the electric motor thereof being employed to propel the vehicle and the engine to be employed to drive said motor as a dynamo for the purpose of replenishing the batteries on the vehicle at times when the vehicle is still, as when in the barn or waiting in the road.

Another object of the invention is to provide a self-charging vehicle having means whereby after the engine is started to charge the batteries the vehicle may be left unwatched and unattended and the engine will be automatically stopped when the batteries become fully charged, the labor and annoyance of fitting the vehicle for use being thus reduced to a minimum.

My invention consists generally in a motor-vehicle carrying a storage battery and having an electric motor supplied with current from said battery and adapted to drive the vehicle and a small independent motor, preferably an explosion-engine, also arranged upon the vehicle and adapted to be connected with said motor to operate the same as a dynamo to generate electricity and recharge said battery.

The invention further consists in particular means for controlling the operation of the engine and in constructions and combinations of parts, all as hereinafter described, and particularly pointed out in the claims.

The invention will be more readily understood by reference to the accompanying drawings, forming part of this specification, and in which—

Figure 4:
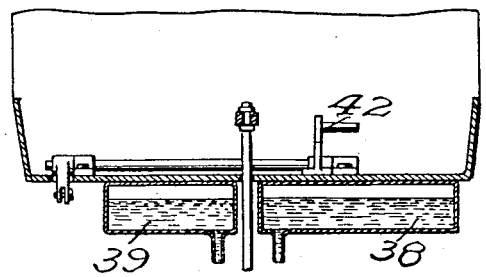
Figure 3:
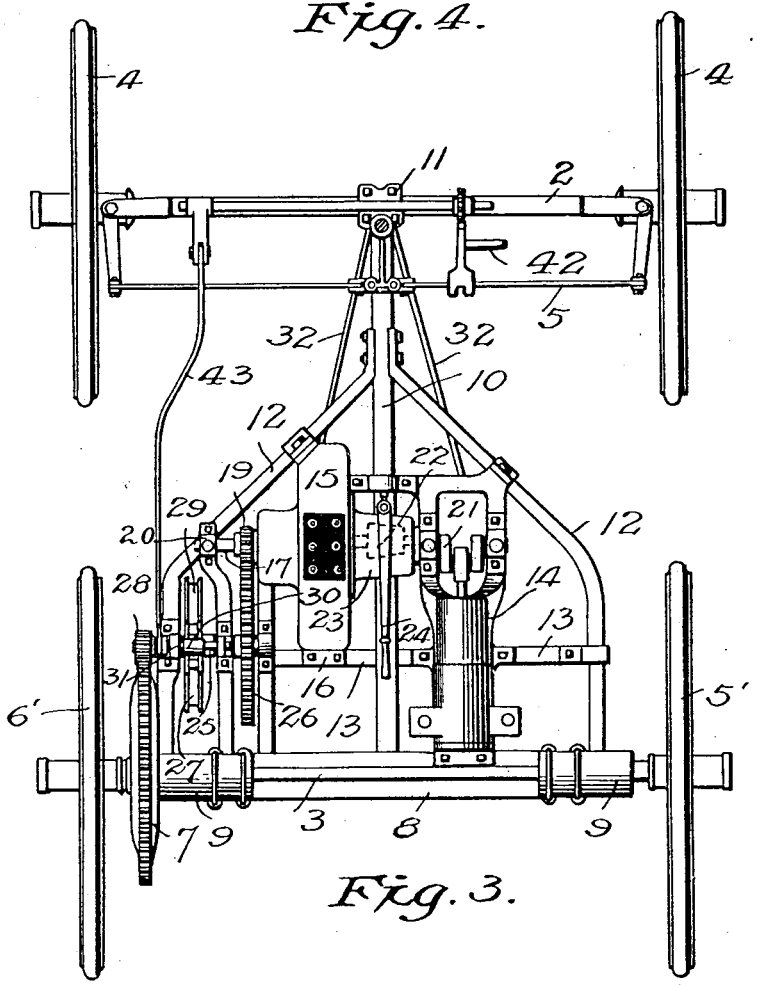
Figure 5:
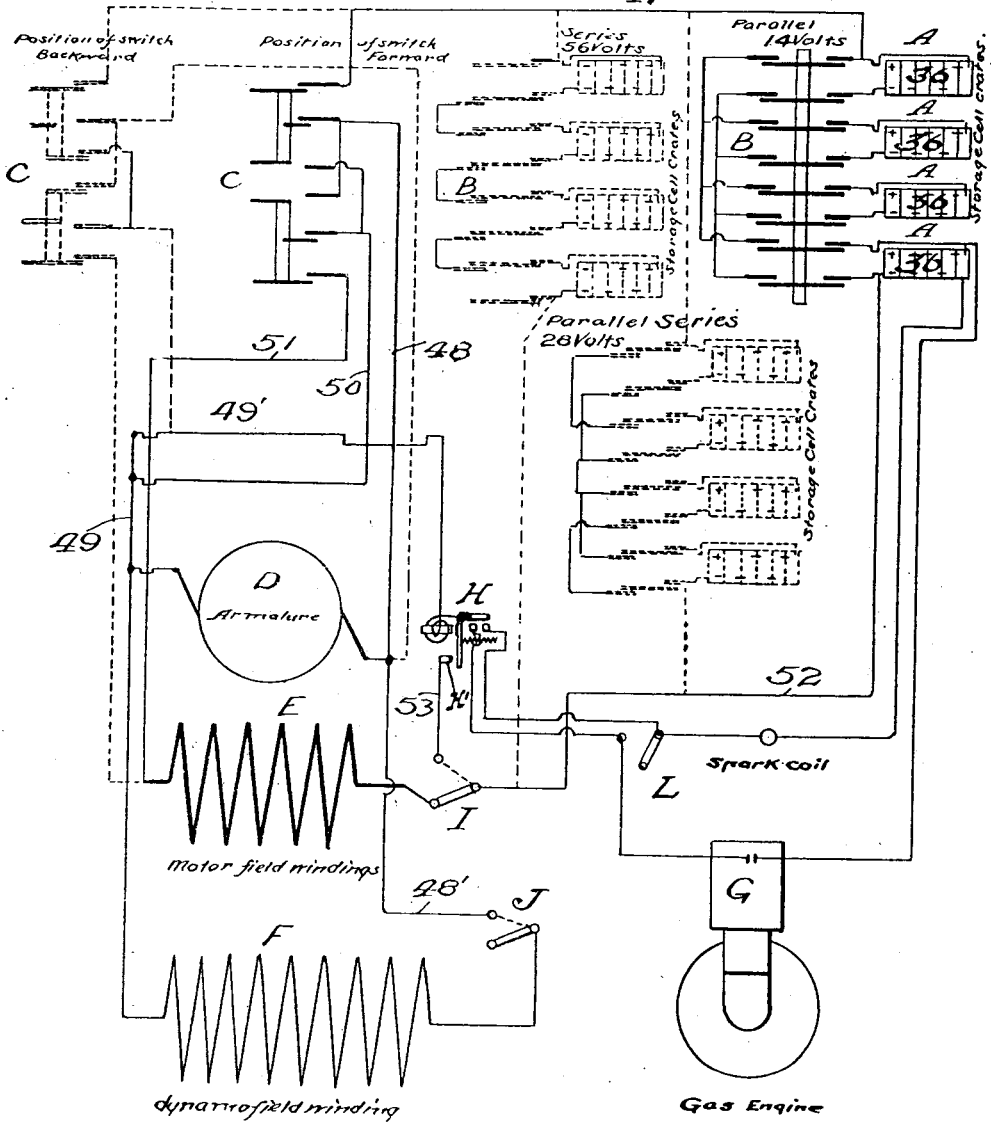

Figure 1 is a side elevation of a motor-vehicle embodying my invention. Fig. 2 is a vertical section thereof. Fig. 3 is a plan view of the running-gear or truck of the vehicle. Fig. 4 is a transverse section on the line $x\,x$ of Fig. 1. Fig. 5 is a diagrammatic representation of the electric circuits of the machine. Fig. 6 is a detail of the slip-gear 19.

As shown in the drawings, 2 and 3 represent the forward and rear axles of the vehicle. The front wheels 4 are arranged in yokes pivoted at the ends of the forward axle, the wheels being turned by the steering-gear 5, of which the tiller 6 is a part. The wheels 5' and 6' of the rear axle are respectively fixed and journaled thereon, the wheel 6' being connected with the axle by the differential gear 7, which permits the independent movement of the wheels 5' and 6', as required in turning corners with the vehicle.

8 represents a truss or beam that swings from the bearings 9 on the axle 3.

10 represents the main reach, that extends from the block 11 on the forward axle to a fastening in the truss or beam 8. The side sections 12 have their rear ends fastened at the ends of the truss 8, and their forward ends are secured to the reach 10, near the forward end thereof. The three parts 12 and 10 are strongly and firmly connected and made rigid by the engine-frame, the frame of the dynamo-motor, and one or more crossbars 13. The explosion-engine frame 14 occupies a horizontal position and is attached to the truss 8 and at its forward end to the trusses 10 and 12. The frame or field portion 15 of the electric motor is provided with lugs 16, that are bolted or clamped to the cross-bar 13 and the side section 12 of the reach. The electric machine is provided with an armature that is entirely incased within the field portion 15 of said machine, the shaft 17 thereof extending through bearings in the ends of said frame or casing. The outer end of the armature-shaft carries the driving-pinion 19, and said outer end is preferably additionally supported by a light bearing 20, provided upon the reach or frame of the vehicle. The crank-shaft 21 of the engine is concentric with the armature-shaft and is adapted to be connected with said shaft by means of a sliding clutch 22, arranged within the casing 23 on the end of the motor. Said clutch is adapted to be operated by the hand-lever 24 and is normally out of engagement.

25 represents an intermediate shaft provided with the reduction-gear 26, which meshes with the driving-pinion 19. This shaft carries the friction brake-wheel 27 between suitable bearings for the shaft, and on the end of the shaft is the driving-pinion 28, that meshes with the differential gear mechanism 7. The friction-wheel 27 is firmly secured upon said shaft 25 and is adapted to be engaged by a brake-strap 29, that is operated by the take-up device 30, arranged upon a bracket 31 on the reach or frame. I prefer to stiffen the reach or frame of the truck by two or more truss or supporting rods 32, extending from the block 11 upon the forward axle to a fastening directly upon the lower part of the frame of the electric machine and the engine. Similar rods may extend from the frame of said machine and said engine to the rear axle.

The box or body 33 is arranged upon springs 34, secured on the forward and rear axles, and the body is provided with the large compartment 35 to contain the crates of storage batteries 36 and also to contain the electric controller and reversing-switch box 37. The tanks or reservoirs 38 and 39 for water and gasolene are suspended from the floor of the carriage-body, near the forward end thereof, to place the weight upon the forward wheels, so that the vehicle may be steered easily and safely. Pipes 40 extend downwardly from the water-tank to the jacket of the explosion-engine and the flow of gasolene or oil to the engine is controlled by a suitable valve. I prefer to employ a foot-brake 42 in the forward part of the carriage-body, as represented in Figs. 3 and 4, and the same is connected by a rod 43 with the bell-crank of the brake-strap 29 on the brake-wheel. The lever 44 for operating the controlling and reversing switch is arranged near the seat.

The electric machine that I employ is provided with two sets of field-windings, which are used separately to constitute the machine either a motor or a dynamo. These windings and the relations thereof to the armature and to the controller, the reversing-switch, and the governing-switches are fully shown in the diagram Fig. 5. The controller which I prefer to employ is that shown and described in my pending application of even date herewith, Serial No. 680,793, and the same is true of the reversing-switch, said parts being adapted for simultaneous operation by the single lever 44. Referring to the diagram, 36 36 represent the crates of storage cells or batteries. As shown, each crate contains a number of cells. Seven are here shown. The four crates together, as shown, will be capable of furnishing fourteen volts when the same are charged and are connected in parallel, twenty-eight volts when the same are connected in parallel series, and fifty-six volts when they are connected in series, all as indicated by the full and dotted line positions of the controller B, respectively. C represents the reversing-switch, which is also shown in dotted lines to indicate the connections thereof when the poles are reversed.

D represents the armature, E the motor-field winding, and F the dynamo-field winding.

G is a diagram of the vapor-engine.

H is the automatic magnetic cut-out, and I and J are governing-switches. The controller is used to vary the voltage of the electric machine, and the reversing-switch is employed to reverse the direction of current in said machine. The motor-field winding is arranged in series with the armature. The dynamo-field winding is arranged in parallel with the armature.

The motor-circuit may be traced as follows: The current flows from the positive terminal of the storage battery through a line 47 to the reversing-switch, passing which the current is carried to the armature D by a line 48 and the commutator-brush of the armature. From the armature the current passes through the opposite commutator-brush to the line 49, and through the branch 50 thereof to the reversing-switch, and through one side thereof to the line 51, that is connected with the motor-field winding E. The opposite terminal of the motor-field winding is connected by the switch I to the return-line 52, that extends back to the negative side of the storage battery.

When it is desired to operate the electric machine as a dynamo, the switch J is thrown to its opposite position to connect the dynamo-field winding with the branch 48' of the line 48. The circuit will now be traced through the line 48 to the armature and there branching through line 48' and switch J to the dynamo-field winding. The current passes through the armature to the line 49 and through the field-winding to the branch line 49', connected with said line 49, the armature and the field windings being thus arranged in multiple or parallel. From the line 49 the current passes through the branch 53 thereof to the switch I and thence to the line 52. Meantime the motor-field winding is in open circuit and is dead.

In practice the explosion-engine used on the vehicle is of about one-third the power of the motor when the latter is in series with the batteries and is operating at its maximum efficiency, while the engine is of substantially the same power as the motor when the latter is in parallel with the batteries. Therefore when the electric machine is changed into a dynamo by the movement of the two switches I and J the small engine is capable of driving the armature at a high speed to furnish current to the batteries when the latter are connected in parallel. The engine is not employed in driving the vehicle unless it should become necessary in case of an accident to the motor when on the road. The engine would be capable of moving the vehicle at a slow speed in such a case. The engine therefore is only employed when the vehicle is stationary, at which time the clutch will be thrown to connect the engine-shaft with that of the armature and the engine may be left to run without attention.

To stop the engine and to prevent a possible leakage through the windings of the armature and field of the electric machine at such time, I prefer to include the automatic circuit-breaker in the dynamo-circuit, whereby upon the equalization of the voltage in the batteries and the dynamo the circuits of the same and the engine-igniter will be automatically opened. This switch H comprises an electromagnet in the line 53, which line is connected to the lever of the magnet and through the same connected with the contact of the switch H', to which the continuation of the line 53 is joined. When the switches I and J are thrown to connect the armature and dynamo windings in multiple, the lever of the switch H is moved by hand against the contact H', whereupon the circuit being closed the magnet of the switch will be energized and will hold said lever in place. When, however, the voltage is equalized on the line or circuit, the magnet will lose its power, and the switch-lever will be withdrawn by the spring of the switch to break the circuit. I prefer also to automatically break the igniter-circuit of the gas-engine at this time. This circuit, as shown in Fig. 5, includes one cell of the storage battery, a spark-coil, the engine-igniter, and two contacts, which are adapted to be abridged by an extension of the lever or arm of the switch H, so that the igniter-circuit will be closed when the dynamo-circuit is complete and will be open when the dynamo-circuit is broken, thereby causing the stoppage of the engine and preventing the short-circuit of a battery through the igniter.

In order that the engine may be started independently of the switch H, I prefer to provide a small switch L in the igniter-circuit, by which the circuit may be bridged to cut out the contacts at the switch H.

The switches H, I, J, and L are preferably located upon the frame of the motor-dynamo beneath the carriage-body, as the same are intended for use only when the vehicle is standing still, as it is necessary that the driver should disengage the pinion 19 (see Figs. 3 and 6) from the large gear-wheel 26 before the switches are thrown and the engine started.

I prefer, after throwing out the pinion, to operate the electric machine as a motor long enough to start the engine and after starting the engine then alter the circuits to constitute said machine a dynamo, manual labor in starting the engine being thus avoided.

As the detail construction of my motor-vehicle may be modified without departing from the spirit of my invention, I do not confine the same to the specific construction herein shown and described.

Having thus described my invention, I claim as new and desire to secure by Letters Patent—

1. The combination, in an electric-motor vehicle, of the running-gear or truck, with a suitably-connected storage battery and electric motor thereon, the latter being adapted to drive the vehicle, and an explosion-engine of less power than said motor and adapted to drive the same to recharge or replenish said battery when the motor is disconnected from the vehicle, substantially as described.

2. The combination, in an electric motor, of the truck or running-gear, with a storage battery arranged thereon, an electric motor in circuit with said truck, an explosion-engine of less power than said motor and adapted to be connected therewith, said motor having double windings, governing-switches for connecting the same with said battery, and a controller whereby said engine is adapted to operate said motor as a dynamo to charge said battery, substantially as described.

3. The combination, in a motor-vehicle, of the truck, with the motor-dynamo arranged thereon to drive the same, said motor-dynamo having independent field-windings, respectively in series and multiple arrangement with the windings of its armature, a storage battery in circuit therewith, means interposed between said battery and said motor-dynamo for electrically governing or controlling the same, and an explosion-engine upon said truck of less power than said motor-dynamo but adapted to drive the same as a dynamo to replenish said battery, substantially as described.

4. The combination, in a motor-vehicle, of the truck, with the motor-dynamo arranged thereon to drive the same, said motor-dynamo having independent field-windings, respectively in series and multiple arrangement with the windings of its armature, a storage battery in circuit therewith, means interposed between said battery and said motor-dynamo for electrically governing or controlling the same, an explosion-engine upon said truck of less power than said motor-dynamo but adapted to drive the same as a dynamo to replenish said battery, and an automatic circuit-breaker included in the battery-circuit, as and for the purpose specified.

5. The combination, in a motor-vehicle, of the truck, with the motor-dynamo arranged thereon to drive the same, said motor-dynamo having independent field-windings, respectively in series and multiple arrangement with the windings of its armature, a storage battery in circuit therewith, means interposed between said battery and said motor-dynamo for electrically governing or controlling the same, an explosion-engine upon said truck of less power than said motor-dynamo but adapted to drive the same as a dynamo to replenish said battery, the igniter of said engine, the local circuit thereof, and an automatic circuit-breaker included therein, whereby when said battery has been fully charged said engine will be automatically stopped, substantially as described.

6. The combination, in a motor-vehicle, of the truck, with the motor-dynamo arranged thereon to drive the same, said motor-dynamo having independent field-windings, respectively in series and multiple arrangement with the windings of its armature, a storage battery in circuit therewith, means interposed between said battery and said motor-dynamo for electrically governing or controlling the same, an explosion-engine upon said truck of less power than said motor-dynamo but adapted to drive the same as a dynamo to replenish said battery, the igniter-circuit of said engine, and an automatic circuit-breaker included in the circuit of said storage battery and motor-dynamo and adapted to automatically break said circuit and said igniter-circuit upon the cessation of current in the battery of the circuit, substantially as described.

7. The combination, in a motor-vehicle, of the truck, with the carriage-body mounted thereon, the storage battery arranged in said body, the electric-motor dynamo geared to the rear driving-wheels of said truck, and electrically connected with said storage battery, controlling and reversing switch included in the circuit of said battery and arranged upon said body, said motor-dynamo having independent windings respectively connected with its armature-windings, means upon the motor for connecting either of said windings in circuit, an explosion-engine arranged on said truck, a clutch for connecting the same with the armature-shaft of said motor-dynamo, and said motor-dynamo being capable of disconnection from the wheels of said truck, whereby said engine may be employed to operate said motor-dynamo to recharge said battery, substantially as described.

8. The combination, in a motor-vehicle, of the truck, with the carriage-body mounted upon springs thereon, the storage battery arranged in said body, the electric-motor dynamo geared to the rear wheels of said truck and connected with said battery, a controlling and reversing switch included in the circuit of said battery, an explosion-engine arranged upon said truck, means for connecting the same with said motor to drive the same as a dynamo to recharge said batteries, and the water and gasolene tanks for said engine arranged upon said carriage-body, substantially as described.

9. The combination, in a motor-vehicle, of the truck, with the carriage-body mounted upon springs thereon, the storage battery arranged in said body, the electric-motor dynamo geared to the rear wheels of said truck and connected with said battery, a controlling and reversing switch included in the circuit of said battery, an explosion-engine arranged upon said truck, means for connecting the same with said motor to drive the same as a dynamo to recharge said batteries, and the water and gasolene tanks depending from the forward part of said carriage-body, substantially as described.

10. The combination, with the rear and forward axles, and the wheels thereon, of the reach extending between said axles, the outer reach-sections, the explosion-engine, and the motor-dynamo, a clutch arranged between the shafts of said engine and motor-dynamo, the clutch-lever, the reduction-gears between the shafts of said motor-dynamo and the rear wheels, the movable pinion included in said gearing, the brake mechanism arranged in connection with said gearing, the body supported upon said axles, and a storage battery connected with said motor and dynamo, substantially as described.

In testimony whereof I have hereunto set my hand, this 3d day of May, 1898, at Minneapolis, Minnesota.

JOHN HENRY MUNSON.

In presence of—
C. G. HAWLEY,
M. E. GOOLEY.